United States Patent Office 2,802,542
Patented Aug. 13, 1957

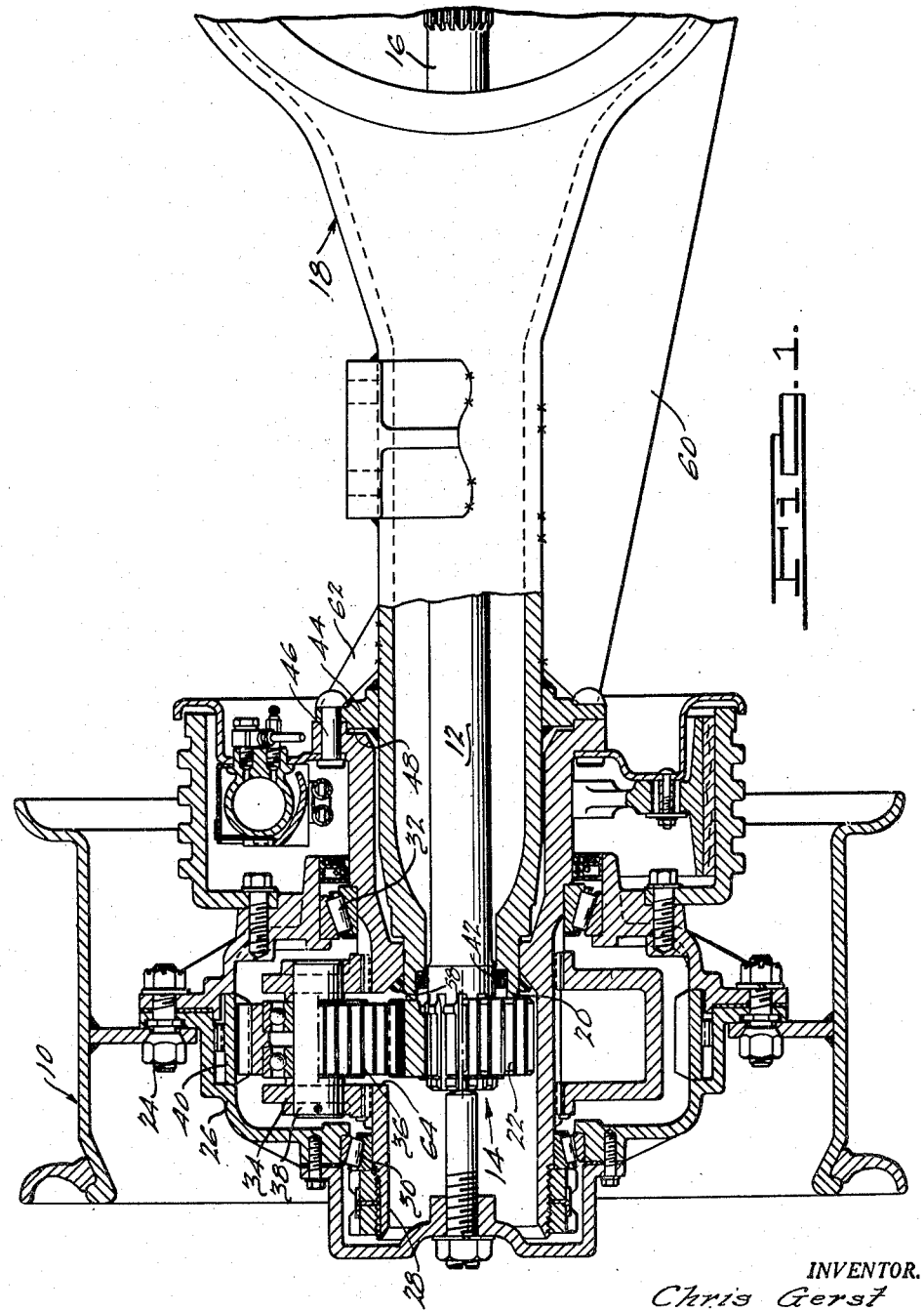

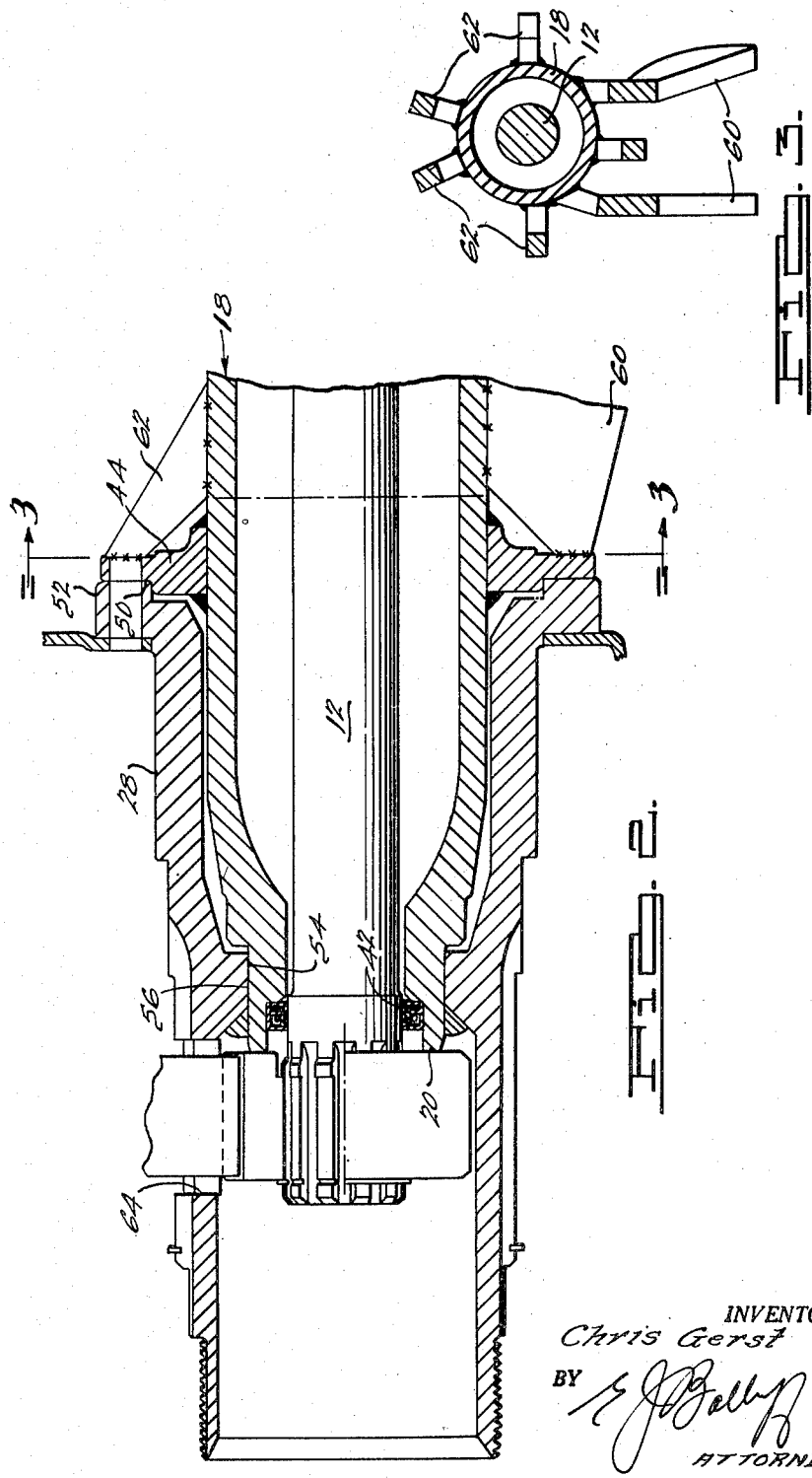

2,802,542

AXLE HOUSING CONSTRUCTION FOR VEHICLE DRIVE WHEELS

Chris Gerst, Detroit, Mich., assignor to The Transmission & Gear Company, Dearborn, Mich., a corporation of Michigan Application April 27, 1954, Serial No. 426,014

4 Claims. (Cl. 180—75)

This invention relates to wheel and axle assemblies for vehicles and has particular reference to new and improved axle housing construction for the drive wheel of a heavy-duty vehicle, such as a tractor, power shovel or the like.

An object of the invention is to provide a new and improved axle housing for a wheel assembly having a planetary gear set providing a speed reduction unit between the axle and the wheel.

Another object of the invention is to provide an axle housing for a drive wheel which is adapted to withstand the heavy bending and torsional stresses to which it is subjected in use.

Another object of the invention is to provide an axle housing of the type described which utilizes a conventional automotive axle housing reinforced and re-machined in such manner as to adapt it for use in a heavy-duty vehicle, such as a power shovel or tractor.

Other and further objects of the invention will be apparent from the following description and claims and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a sectional view of a vehicle wheel and axle embodying the present invention;

Fig. 2 is an enlarged fragmentary sectional view of the axle housing shown in Fig. 1 and constructed according to the principles of this invention;

Fig. 3 is a sectional view taken on line 3—3 of Fig. 2.

In Fig. 1 there is disclosed a vehicle wheel 10 driven by an axle 12 through a planetary gear set indicated at 14. The inner end 16 of the axle 12 is adapted to be driven from a differential unit of conventional design, and the differential unit (not shown) and axle 12 are enclosed by an axle housing 18. It is understood that only one half of the axle housing 18 and related structure is disclosed herein and that the assembly would be duplicated at the other vehicle wheel, the axle housing 18 being substantially symmetrical with respect to the center line of the differential unit.

The axle 12 projects beyond the outer end 20 of the axle housing 18, and the sun gear 22 forming a part of the planetary gear set 14 is splined onto the outer end of axle 12. The vehicle wheel 10 is secured by bolts 24 to a hub 26 which is rotatably journalled on a sleeve 28 by means of bearings 30 and 32, and a pinion carrier 34 splined onto sleeve 28 is provided with three pinions 36 rotatably journalled on pins 38 carried by the pinion carried 34. An internal gear 40 is secured to the inner periphery of hub 26 and meshes with pinions 36, which pinions are meshed with sun gear 22 so that the drive will be transmitted from axle 12 to hub 26 and the wheel 10 through the planetary gear set at a reduced speed.

The construction of the speed reduction unit and hub and the manner in which the hub is supported on the axle housing forms no part of the present invention, but is disclosed and claimed in my co-pending application Serial No. 401,870 for "Vehicle Drive Wheel Assembly" filed January 4, 1954. The present invention is concerned with an improved axle housing construction adapted for use in a drive wheel assembly of the type described in said co-pending application.

I have found that a more or less conventional automotive type axle housing may be utilized in assemblies of the type described by re-machining such axle housing and reinforcing the same to adapt it to withstand the heavy bending and torsional stresses to which it is subjected. The axle housing 18 is cut off at its outer end as at 20, and a seal 42 may be interposed between the outer end of the axle housing 18 and the axle 12 which projects through the open outer end of the housing. A radially extending annular flange 44 is welded or otherwise secured on the exterior surface of the housing 18 inwardly from the outer end thereof. In the modification shown in Fig. 1, the sleeve 28 on which the wheel hub 26 is journalled is telescoped over the outer end of axle housing 18 and rigidly secured to the radial flange 44 by means of rivets 46.

The outwardly facing radial surface 48 of the flange 44 is provided with a machined groove 50 adapted to receive the annular rim 52 formed on the end of sleeve 28 to properly locate the sleeve 28 relative to the flange 44 and housing 18. The sleeve 28 is also provided with an annular internal rib 54 which may be machined to fit an annular seat 56 formed on the exterior of housing 18. The surface 56 on housing 18 and groove 50 formed on flange 44 are surfaces which are presently machined on automotive type axles as manufactured, and therefore the sleeve 28 may be properly located on the housing 18 without the need of additional machining of the housing 18, other than to cut off the outer end of the housing as at 20. A seal 58 may be provided between the sleeve 28 and the outer end of the axle housing 18.

The axle housing 18 is reinforced to withstand the stresses to which it will be subjected while in use in heavy-duty vehicles, such as power shovels or tractors. In the present instance, a pair of axially extending reinforcing ribs 60 are welded to the underside of the housing 18 and to the flange 44. The ribs 60 extend from the inwardly facing radial surface of the flange 44 inwardly along the housing 18 and are provided for absorbing the bending stresses to which the axle housing may be subjected.

A plurality of ribs 62 are welded to the flange 44 and to the exterior surface of the housing 18 for reinforcing the flange and for absorbing torsional stresses which may be imparted to the flange 44 and housing 18. The ribs 62 are circumferentially spaced around the housing 18, and the location thereof and of the ribs 60 is best shown in Fig. 3.

The sleeve 28 is provided with openings 64 through which the pinion gears 36 project into engagement with the sun gear 22 in the manner described in the above-identified co-pending application.

The axle housing construction described herein enables use of a conventional automotive type axle for the drive wheels of heavy-duty vehicles, and such housing construction represents a substantial reduction in manufacturing costs of vehicles of this type.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In a vehicle drive wheel assembly including a wheel hub, a drive axle projecting into said hub and a planetary gear set providing a driving connection between said axle and hub; a tubular axle housing open at its outer end and through which said axle projects into said hub, said axle housing having a radially extending annular flange thereon, a casing member secured to said flange and having a sleeve portion surrounding the outer end of said axle, said hub being rotatably journalled on said sleeve portion, a pair of axially extending reinforcing ribs welded to the underside of said axle housing and extending from said flange axially inwardly a substantial distance along said axle housing for taking bending stresses imparted to said axle housing, and a plurality of circumferentially spaced, axially extending ribs welded to the inwardly facing radial surface of said flange and to the exterior surface of said axle housing closely adjacent said flange for taking torsional stresses imparted to said flange and axle housing.

2. In a vehicle drive wheel assembly including a wheel hub, a drive axle projecting into said hub and gear means providing a driving connection between said axle and hub; a tubular axle housing surrounding said axle and terminating inwardly of the outer end of said axle, said axle housing having a radially extending annular flange thereon, a casing member secured to said flange and having a sleeve portion surrounding the outer end of said axle, said hub being rotatably journalled on said sleeve portion, an axially extending reinforcing rib secured to the underside of said axle housing and extending from said flange axially inwardly a substantial distance along said axle housing for absorbing bending stresses imparted to said axle housing, and a plurality of circumferentially spaced, axially extending ribs secured to the inwardly facing radial surface of said flange and to the exterior surface of said axle housing closely adjacent said flange for absorbing torsional stresses imparted to said flange and axle housing.

3. In a vehicle drive wheel assembly including a wheel hub, a drive axle projecting into said hub and gear means providing a driving connection between said axle and hub; a tubular axle housing surrounding said axle and terminating inwardly from the outer end of said axle, said axle housing having a radially extending annular flange thereon disposed axially inwardly of the outer end of said axle housing, a sleeve telescoped over the outer end of said axle housing and rigidly secured to said flange and surrounding the outer end of said axle, said sleeve having a portion bearing on the outer end of said axle housing, said hub being rotatably journalled on said sleeve, axially extending reinforcing ribs welded to the underside of said axle housing and extending from said flange axially inwardly a substantial distance along said axle housing for absorbing bending stresses imparted to said axle housing, and a plurality of circumferentially spaced, axially extending ribs welded to the inwardly facing radial surface of said flange and to the exterior surface of said axle housing closely adjacent said flange for absorbing torsional stresses imparted to said flange and axle housing.

4. In a vehicle drive wheel assembly including a wheel hub, a drive axle projecting into said hub and a planetary gear set providing a driving connection between said axle and hub; an axle housing open at its outer end and through which said axle projects into said hub, said axle housing having a radially extending flange thereon, a sleeve member surrounding the outer end of said axle and secured to said flange, said hub being rotatably journalled on said sleeve member, an axially extending reinforcing rib secured to said axle housing and extending from said flange inwardly a substantial distance along said axle housing, and a plurality of circumferentially spaced, axially extending ribs secured to said flange and to said axle housing closely adjacent said flange.

References Cited in the file of this patent

UNITED STATES PATENTS

| | | |
|---|---|---|
| 1,371,904 | Klein | Mar. 15, 1921 |
| 1,482,577 | Nacker | Feb. 5, 1924 |
| 1,570,941 | Carroll | Jan. 26, 1926 |
| 2,095,344 | Nelson | Oct. 12, 1937 |

FOREIGN PATENTS

| | | |
|---|---|---|
| 479,722 | France | Feb. 5, 1916 |
| 23,001 | Great Britain | 1906 |
| 475,166 | Great Britain | May 13, 1937 |